United States Patent
Suzuki

(10) Patent No.: US 9,002,276 B2
(45) Date of Patent: Apr. 7, 2015

(54) IMAGE PROVIDING APPARATUS, IMAGE OUTPUT APPARATUS, AND IMAGE OUTPUT SYSTEM

(75) Inventor: Takayuki Suzuki, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 877 days.

(21) Appl. No.: 12/493,430

(22) Filed: Jun. 29, 2009

(65) Prior Publication Data

US 2009/0325493 A1  Dec. 31, 2009

(30) Foreign Application Priority Data

Jun. 30, 2008 (JP) ................................. 2008-171239

(51) Int. Cl.
| | | |
|---|---|---|
| H04B 7/00 | (2006.01) | |
| H04N 5/77 | (2006.01) | |
| H04L 12/12 | (2006.01) | |
| H04N 1/00 | (2006.01) | |
| H04N 21/442 | (2011.01) | |
| G06F 3/12 | (2006.01) | |
| H04N 5/765 | (2006.01) | |
| H04N 5/907 | (2006.01) | |
| H04N 9/804 | (2006.01) | |

(Continued)

(52) U.S. Cl.
CPC ............... H04N 5/772 (2013.01); H04L 12/12 (2013.01); H04N 1/00278 (2013.01); H04N 1/00347 (2013.01); H04N 1/00885 (2013.01); H04N 1/00896 (2013.01); H04N 5/765 (2013.01); H04N 5/907 (2013.01); H04N 9/8042 (2013.01); H04N 9/8205 (2013.01); H04N 21/44227 (2013.01); H04N 2101/00 (2013.01); H04N 2201/0015 (2013.01); H04N 2201/0036 (2013.01); H04N 2201/0041 (2013.01); *H04N 2201/0046* (2013.01); *H04N 2201/0055* (2013.01); *H04N 2201/0082* (2013.01); *H04N 2201/0084* (2013.01); *G06F 3/1204* (2013.01); *G06F 3/1209* (2013.01); *G06F 3/1226* (2013.01); *G06F 3/1236* (2013.01); *G06F 3/128* (2013.01); *G06F 3/1286* (2013.01); *G06F 3/1292* (2013.01)

(58) Field of Classification Search
USPC ..................... 455/41.2, 41.3, 41.1; 348/270.2
See application file for complete search history.

(56) References Cited

U.S. PATENT DOCUMENTS

| | | | |
|---|---|---|---|
| 2004/0012805 A1* | 1/2004 | Tojo | ............................. 358/1.13 |
| 2005/0170828 A1* | 8/2005 | Nakamura et al. | ............ 455/419 |

(Continued)

FOREIGN PATENT DOCUMENTS

JP    2004-056220    2/2004

*Primary Examiner* — Nay A Maung
*Assistant Examiner* — Erica Fleming-Hall
(74) *Attorney, Agent, or Firm* — Cowan, Liebowitz & Latman, P.C.

(57) ABSTRACT

In an image providing apparatus capable of performing close-proximity wireless communication, it is determined whether or not the image providing apparatus come to an active state by moving close to the image output apparatus (whether or not the apparatus has been remotely woken up) if a connection through close-proximity wireless communication is established. It is decided that the image output apparatus is the primary controller after the connection if the image providing apparatus has been remotely woken up, and the use of an appropriate protocol for the primary controller is decided on. On the other hand, if the image providing apparatus has not been remotely woken up, it is decided that the image providing apparatus is the primary controller after connection, and the use of a corresponding protocol is decided on.

18 Claims, 6 Drawing Sheets

(51) Int. Cl.
   *H04N 9/82*  (2006.01)
   *H04N 101/00*  (2006.01)

(56) References Cited

U.S. PATENT DOCUMENTS

| | | | |
|---|---|---|---|
| 2005/0237568 A1* | 10/2005 | Yun | 358/1.15 |
| 2006/0101280 A1* | 5/2006 | Sakai | 713/184 |
| 2006/0184705 A1* | 8/2006 | Nakajima | 710/303 |
| 2006/0274179 A1* | 12/2006 | Sugiyama et al. | 348/333.01 |
| 2007/0001005 A1* | 1/2007 | White et al. | 235/451 |
| 2008/0132167 A1* | 6/2008 | Bent et al. | 455/41.2 |
| 2008/0291852 A1* | 11/2008 | Abel | 370/296 |
| 2009/0002757 A1* | 1/2009 | Kitahara et al. | 358/1.15 |
| 2009/0036056 A1* | 2/2009 | Oshima et al. | 455/41.3 |
| 2009/0052348 A1* | 2/2009 | Kato et al. | 370/254 |

* cited by examiner

IMAGE PROVIDING APPARATUS, IMAGE OUTPUT APPARATUS, AND IMAGE OUTPUT SYSTEM

BACKGROUND OF THE INVENTION

1. Field of the Invention

The present invention relates to an image providing apparatus, an image output apparatus, and an image output system, and particularly relates to an image providing apparatus and an image output apparatus having a close-proximity wireless communication function, and to an image output system including such an image providing apparatus and image output apparatus connected through close-proximity wireless communication.

2. Description of the Related Art

Development of systems using close-proximity wireless communication through an induced electric field is being carried out in recent years. Because of its short communication range, the induced electric field does not easily affect other wireless systems, and because high-speed transfer is possible, the induced electric field is suitable for communicating large amounts of data, such as image data, between devices.

Meanwhile, direct print systems, in which a digital camera and a printer are directly connected and images in a storage medium of the digital camera are sent to the printer and printed has come to be known in recent years. In such a direct print system, a user can perform settings and give instructions relating to printing by operating an operation unit of the digital camera. Also, a direct print system in which settings and instructions relating to printing can be performed by operating an operation unit of the printer has been proposed (Japanese Patent Laid-Open No. 2004-56220).

By using the close-proximity wireless communication for data communication between the printer and the digital camera that make up the direct print system, not only is a cable connection unnecessary, but a reduction in communication time can also be achieved.

However, there is a problem in that which of the digital camera and the printer should be used for operations relating to the print processing changes depending on, for example, connection protocols when connecting the digital camera to the printer.

For example, a system called PictBridge (CIPA DC-001-2003) is known as a standard for realizing direct printing. When the printer and the digital camera are connected according to the PictBridge standard, instructions for print settings, the start of printing, and the like are to be given through operations made through the digital camera.

Meanwhile, many digital cameras are capable of being connected to printers as USB Mass Storage Class devices. In this case, the digital camera acts as a storage device connected to the printer, and therefore instructions for print settings, the start of printing, and the like are given through operations made through the printer.

However, it is troublesome for a user to set whether the digital camera is to be the primary controller or the printer is to be the primary controller by operating the operation unit when the digital camera and the printer are connected.

Furthermore, depending on the devices, there is also a case where the user is to select the protocol to be used rather than the primary controller to be used. In such a case, it is not easy for the user to make settings so as to enable a connection under the protocol compatible with the device the user intends to use as the primary controller.

Also, even if the user has a good grasp of the relationship between the primary controller and the connection protocol, it is difficult to set the protocol while keeping the digital camera close to the printer. Because the communication range of the close-proximity wireless communication is short as mentioned above, if, for example, the user moves the digital camera while setting the protocol, the camera may move outside of the communication range, and may unintentionally disconnect the communication.

SUMMARY OF THE INVENTION

The present invention provides an image providing apparatus, an image output apparatus, and an image output system that solve at least one of the aforementioned problems, and in which usability at the time of close-proximity wireless communication is improved.

According to one aspect of the present invention, there is provided an image providing apparatus including a communication unit for communicating with an image output apparatus through close-proximity wireless communication, and capable of constituting an image output system along with the image output apparatus that is connected via the communication unit, the image providing apparatus comprising: a determination unit that determines whether or not the image providing apparatus come to an active state by moving close to the image output apparatus if a connection through the close-proximity wireless communication is established with the image output apparatus by the communication unit, and a decision unit that decides on the primary controller in the image output system as one of the image providing apparatus and the image output apparatus according to a result of the determination by the determination unit, wherein the decision unit decides that the primary controller in the image output system is the image output apparatus if the determination unit has determined that the image providing apparatus come to an active state by moving close to the image output apparatus, and decides that the primary controller in the image output system is the image providing apparatus if the determination unit has not determined that the image providing apparatus come to an active state by moving close to the image output apparatus.

According to another aspect of the present invention, there is provided an image output apparatus including a communication unit for communicating with an image providing apparatus through close-proximity wireless communication, and capable of constituting an image output system along with the image providing apparatus that is connected via the communication unit, the image output apparatus comprising: a receiving unit that receives, from the image providing apparatus, a notification of the primary controller of the image output system that is constituted along with the image providing apparatus if a connection with the image providing apparatus through the close-proximity wireless communication is established by the communication unit, and a sending unit that sends, to the image providing apparatus via the communication unit, a command that causes the image providing apparatus to enter a sleep state if the receiving unit has received the notification indicating that the image output apparatus is the primary controller.

According to still another aspect of the present invention, there is provided an image output system constituted by an image output apparatus and an image providing apparatus connected through close-proximity wireless communication, the image providing apparatus comprising: a determination unit that determines whether or not the image providing apparatus come to an active state by moving close to the image output apparatus if a connection through the close-proximity wireless communication is established with the image output apparatus, a decision unit that decides that the primary controller in the image output system is the image output apparatus if the determination unit has determined that the image providing apparatus come to an active state by moving close to the image output apparatus, and decides that the primary controller in the image output system is the image providing apparatus if the determination unit has not determined that the image providing apparatus come to an active state by moving close to the image output apparatus, and a notification unit that notifies the image output apparatus of the primary controller; and the image output apparatus comprising: a receiving unit that receives, from the image providing apparatus, a notification of the primary controller if a connection with the image providing apparatus through the close-proximity wireless communication is established, and a sending unit that sends, to the image providing apparatus, a command that causes the image providing apparatus to enter a sleep state if the receiving unit has received the notification indicating that the image output apparatus is the primary controller.

According to still another aspect of the present invention, there is provided a method for controlling an image providing apparatus including a communication unit for communicating with an image output apparatus through close-proximity wireless communication, and capable of constituting an image output system along with the image output apparatus that is connected via the communication unit, the method comprising: a determination step of determining whether or not the image providing apparatus come to an active state by moving close to the image output apparatus if a connection through the close-proximity wireless communication is established with the image output apparatus by the communication unit, and a decision step of deciding on the primary controller in the image output system constituted along with the image output apparatus as one of the image providing apparatus and the image output apparatus according to a result of the determination in the determination step, wherein in the decision step, it is decided that the primary controller in the image output system constituted along with the image output apparatus is the image output apparatus if it is determined that the image providing apparatus come to an active state by moving close to the image output apparatus in the determination step, and it is decided that the primary controller in the image output system is the image providing apparatus if it is not determined that the image providing apparatus come to an active state by moving close to the image output apparatus.

According to still another aspect of the present invention, there is provided a method for controlling an image output apparatus including a communication unit for communicating with an image providing apparatus through close-proximity wireless communication, and capable of constituting an image output system along with the image providing apparatus that is connected via the communication unit, the method comprising: a receiving step in which a notification of the primary controller of the image output system that is constituted along with the image providing apparatus is received from the image providing apparatus if a connection with the image providing apparatus through the close-proximity wireless communication is established by the communication unit, and a sending step in which a command that causes the image providing apparatus to enter a sleep state is sent to the image providing apparatus via the communication unit if the notification indicating that the image output apparatus is the primary controller is received in the receiving step.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Figure 1:
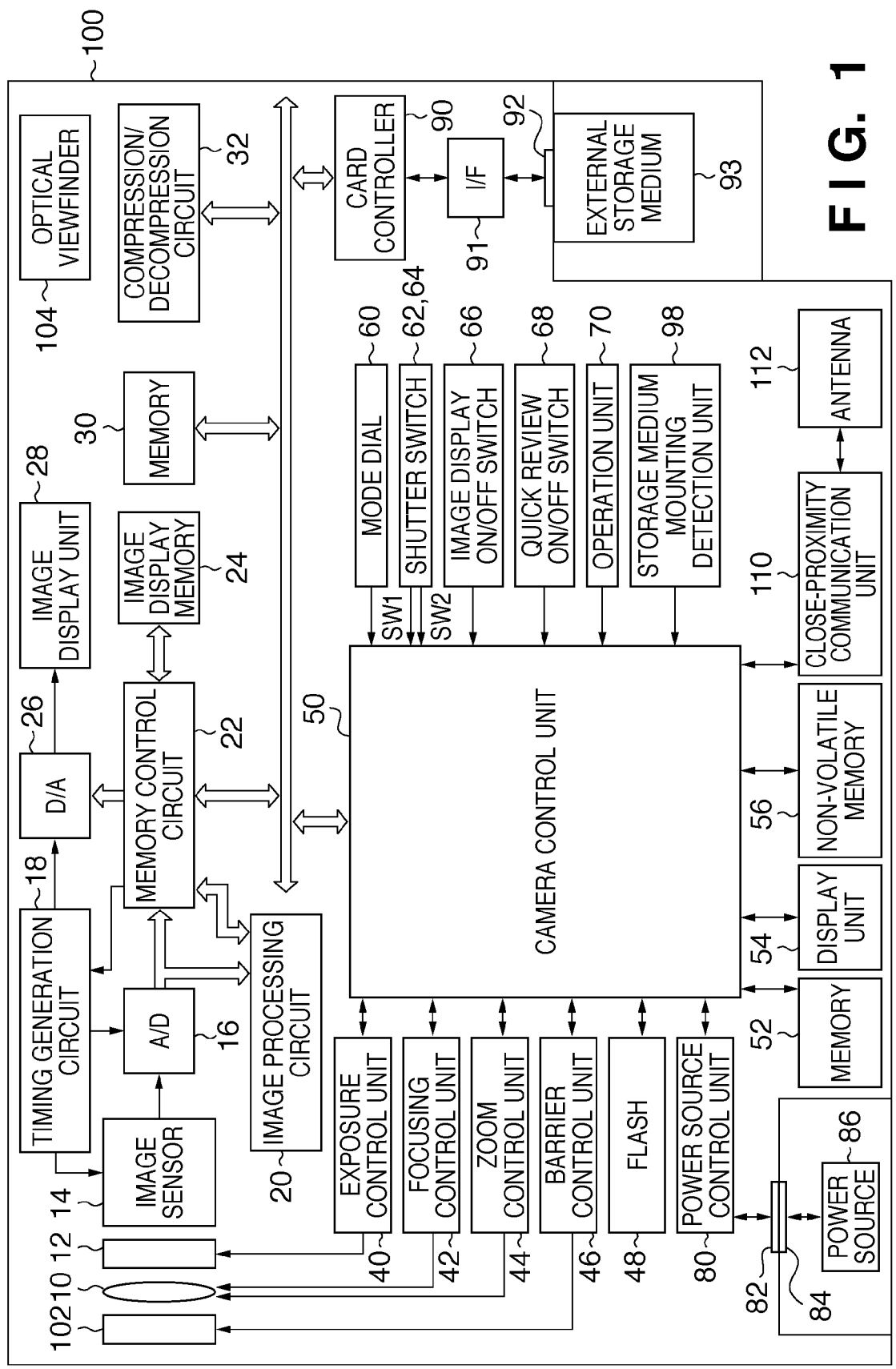
FIG. 1 is a block diagram illustrating an exemplary configuration of a digital camera as an example of an image providing apparatus according to an embodiment of the present invention.

FIG. 1 is a block diagram illustrating an exemplary configuration of a digital camera 100 as an example of an image providing apparatus according to an embodiment of the present invention. The digital camera 100 and an image output apparatus (here, a printer 201) that are connected through close-proximity wireless communication are capable of constituting an image output system (for example, a direct print system).

In FIG. 1, a lens 10 is, for example, a zoom lens having an auto focus function. A shutter 12 includes a diaphragm, and operates under the control of an exposure control unit 40. An image sensor 14 is a photoelectric converter such as a CCD image sensor, a CMOS image sensor, or the like, and converts an optical image formed by the lens 10 to an analog electric signal in pixels. An A/D converter 16 converts the analog electric signal created by the image sensor 14 to digital data.

A timing generation circuit 18 is controlled by a memory control circuit 22 and a camera control unit 50, and supplies clock signals and control signals to the image sensor 14, the A/D converter 16, and a D/A converter 26.

An image processing circuit 20 performs image processing such as pixel interpolation processing and color conversion processing, on data from the A/D converter 16 or data from the memory control circuit 22. The image processing circuit 20 also performs predetermined computational processing using captured image data, and supplies the result of the computational processing to the camera control unit 50. The image processing circuit 20 also performs predetermined computational processing using captured image data, and realizes AWB (auto white balance) processing using the TTL (through the lens) method based on the obtained result of the computational processing.

The camera control unit 50 controls the lens 10 and the shutter 12 through the exposure control unit 40 and a focusing control unit 42 based on the result of the computational processing from the image processing circuit 20, thereby realizing TTL AF (auto focus) processing and AE (auto exposure) processing. The camera control unit 50 also controls a flash 48 based on the result of the computational processing from the image processing circuit 20, thereby realizing EF (electronic flash pre-emission) processing.

The memory control circuit 22 controls the A/D converter 16, the timing generation circuit 18, the image processing circuit 20, an image display memory 24, the D/A converter 26, a memory 30, and a compression/decompression circuit 32. Digital data from the A/D converter 16 is written into the memory 30 or the image display memory 24 as image data, through both the image processing circuit 20 and the memory control circuit 22 or the memory control circuit 22 only.

The image data for display written in the image display memory 24 is displayed in an image display unit 28, such as an LCD or an organic EL display, through the D/A converter 26. By sequentially displaying the image data captured by the image sensor 14 on the image display unit 28, the image display unit 28 can function as an electronic view finder (EVF). The image display unit 28 can be controlled from the camera control unit 50 to be turned on/off, and the power consumption of the digital camera 100 can be reduced when the image display unit 28 is turned off.

The memory 30 stores still image data and movie data obtained by shooting. The memory 30 has a storage capacity sufficient for storing a predetermined number of still images and a predetermined amount of movies. Thus, continuous shooting, in which a plural number of still images are sequentially shot, and panorama shooting, and so on can be realized. The memory 30 can also be used also as a working area for the camera control unit 50.

The compression/decompression circuit 32 loads the image data stored in the memory 30 and performs known data compression processing or decompression processing using an adaptive discrete cosine transform (ADCT), a wavelet transform, or the like, and writes the processed data in the memory 30.

The exposure control unit 40 controls the shutter 12 and controls the exposure amount of the image sensor 14. The exposure control unit 40 also has a function for adjusting the flash light in cooperation with the flash 48.

The focusing control unit 42 controls the focus of the lens 10, and a zoom control unit 44 controls the zoom of the lens 10. A barrier control unit 46 controls movement of a protection unit 102, that is, a lens barrier for protecting the lens 10.

The flash 48 functions as a supplemental light source at the time of shooting, and also has a light adjustment function. Moreover, the flash 48 also has a function for projecting supplemental AF light.

The exposure control unit 40 and the focusing control unit 42 are controlled using the TTL method, and the camera control unit 50 controls the exposure control unit 40 and the focusing control unit 42 based on the result of computational processing on image data of captured images by the image processing circuit 20.

The camera control unit 50 is, for example, a CPU, and controls the digital camera 100 as a whole by executing programs stored in a memory 52. The memory 52 stores constants, variables, programs, and the like for operations performed by the camera control unit 50.

The camera control unit 50 also creates an output processing definition script that defines output processing for an image output apparatus such as a printer, and sends the script to the image output apparatus (not shown) via a close-proximity communication unit 110 and an antenna 112.

The antenna 112 and the close-proximity communication unit 110 supply scripts to the camera control unit 50 when those scripts are received from the image output apparatus (not shown). The camera control unit 50 analyzes the scripts and controls the digital camera 100 based on the analysis result.

In this embodiment, the close-proximity communication unit 110 has functions for detecting close-proximity wireless communication connected/disconnected states, and for notifying the camera control unit 50 of the detected states.

A display unit 54 is configured of, for example, a combination of output devices such as an LCD or LED, a speaker, and the like, and outputs the operation status, messages, and the like using text, images, sounds, and the like according to programs executed in the camera control unit 50. The display unit 54 is placed in the proximity of an operation unit 70 of the digital camera 100 at an easily viewable position, singly or in multiple. The display unit 54 is partially provided in an optical viewfinder 104.

Among the items displayed on the display unit 54, the items to be displayed on a dot matrix display, such as an LCD, include information on single shooting/continuous shooting, a self-timer, the compression rate, the number of stored pixels, the number of stored images, the number of images that can be shot, the shutter speed, and the aperture value. Furthermore, information of exposure correction, flash, red-eye reduction, macro shooting, buzzer settings, the remaining clock battery power, the remaining battery power, errors, an information display using multiple digits, the mounting state of an external storage medium 93, the date and time, and the like are also displayed on the LCD.

Among the items to be displayed on the display unit 54, those items to be displayed in the optical viewfinder 104 include information for focus confirmation, a camera shake warning, flash charge, the shutter speed, the aperture value, exposure correction, and the like.

A non-volatile memory 56 is a memory that can be recorded to and erased electrically, and, for example, an EEPROM is used therefor.

A mode dial switch 60 switches modes from among various function modes such as power off, an auto shooting mode, a shooting mode, a panoramic shooting mode, a playback mode, a multi screen playback/delete mode, and a PC connection mode.

A first shutter switch (SW 1) 62 is turned on at the first stroke of a shutter button (not shown) provided on the digital camera 100 (when, for example, the button is pressed halfway). When the first shutter switch (SW 1) 62 is turned on, AF (auto focus) processing, AE (auto exposure) processing, AWB (auto white balance) processing, EF processing, and the like are started.

A second shutter switch (SW 2) 64 is turned on at the second stroke of the shutter button provided on the digital camera 100 (when, for example, the button is pressed all the way), thereby instructing the start of a series of processes including exposure processing, development processing, and recording processing. First, in the exposure processing, image data signals read out from the image sensor 14 are written into the memory 30 after being passed through the A/D converter 16 and the memory control circuit 22, and further, the development processing is performed using computational processing performed by the image processing circuit 20 and the memory control circuit 22. Furthermore, the recording processing is performed, in which the image data is read out from the memory 30, compressed by the compression/decompression circuit 32, and written into the external storage medium 93.

An image display on/off switch 66 is a switch by which a user instructs the image display unit 28 to be turned on/off. By turning the image display unit 28 off at the time of shooting using the optical viewfinder 104, energy-saving operations are possible.

A quick review on/off switch 68 is a switch for a user to set a quick review function to turn on/off, by which image data obtained from shooting is automatically played back immediately after the shooting.

The operation unit 70 includes operational unit members such as switches, buttons, a rotation dial switch, a touch panel, and the like, and is a user interface for a user to make various settings and instructions for the digital camera 100. The operation unit 70 includes, for example, a menu button, a set (execute) button, a macro button, a multi screen playback page break button, a flash setting button, and a single shooting/continuous shooting/self-timer switch button. In addition, other than those described above, a menu shift +/− button, a playback image shift +/− button, a shooting image quality selection button, an exposure correction button, a date/time setting button, an image deletion button, an image deletion cancel button, and the like may be included.

A power source control unit 80 is configured of a battery detection circuit, a DC-DC converter, a switch circuit that switches blocks to be energized, and the like, and detects if batteries are loaded, the type of battery, and remaining battery power. The power source control unit 80 controls the DC-DC converter based on results of such detection and instructions from the camera control unit 50, and supplies the necessary voltage for the necessary period of time to respective units including the external storage medium 93.

A power source 86 includes primary batteries such as alkaline batteries and lithium batteries; secondary batteries such as NiCd batteries, NiMH batteries, and Li batteries; and an AC adapter, and is connected to the power source control unit 80 via connectors 82 and 84.

An interface 91 is an interface with the external storage medium 93, and a connector 92 is a connector that makes an electric and mechanical connection with a removable external storage medium 93. A storage medium mounting detection unit 98 detects whether or not the external storage medium 93 is mounted to the connector 92.

The protection unit 102 prevents the lens 10 from dirt and damage while, for example, the digital camera 100 is not in use, by dynamically covering the end portion of the lens 10 under the control of the camera control unit 50.

The optical viewfinder 104 is, for example, a TTL finder, and forms images from a light beam that has passed through the lens 10 using prisms and mirrors. By using the optical viewfinder 104, shooting can be performed without using the EVF function of the image display unit 28. Furthermore, as described above, information on the functions shown in the display unit 54 is partially displayed, including, for example, focus confirmation, a camera shake warning, flash charge, a shutter speed, an aperture value, and exposure correction in the optical viewfinder 104.

The close-proximity communication unit 110 performs close-proximity wireless communication with an external device (in this embodiment, a printer) via the antenna 112 according to a predetermined communication protocol. In this specification, the "close-proximity wireless communication" means wireless communication based on a communication protocol specified assuming the communication range of less than 1 m, and particularly below several tens of centimeters. For such a communication protocol, a "vicinity type" noncontact communication protocol, with a communication range of about 70 cm or less, and a "close-proximity type" noncontact communication protocol, with a communication range of about 10 cm or less are known. To be specific, standards such as ISO/IEC 15693, ISO/IEC 14434, and ECMA-340 (ISO/IEC 18092) are available.

The close-proximity communication unit 110 is capable of communication when the close-proximity communication unit of another device is present in the communication range. The communication is terminated when the close-proximity communication unit of another device that was in the communication moves away from the communication range. The close-proximity communication unit 110 thus has a function of detecting the connection status (connected or disconnected) of close-proximity wireless communication. The close-proximity communication unit 110 notifies the camera control unit 50 of the detected connection status.

The camera control unit 50 creates an output processing definition script that is to be sent to the external device based on the notified connection status.

The camera control unit 50 may be realized by a single piece of hardware, or may be configured from a plurality of pieces of hardware taking partial charge of the processing so as to substantially function as a camera control unit 50. At least a part of the processing may be realized by software.

(Printer Configuration)

Figure 2:
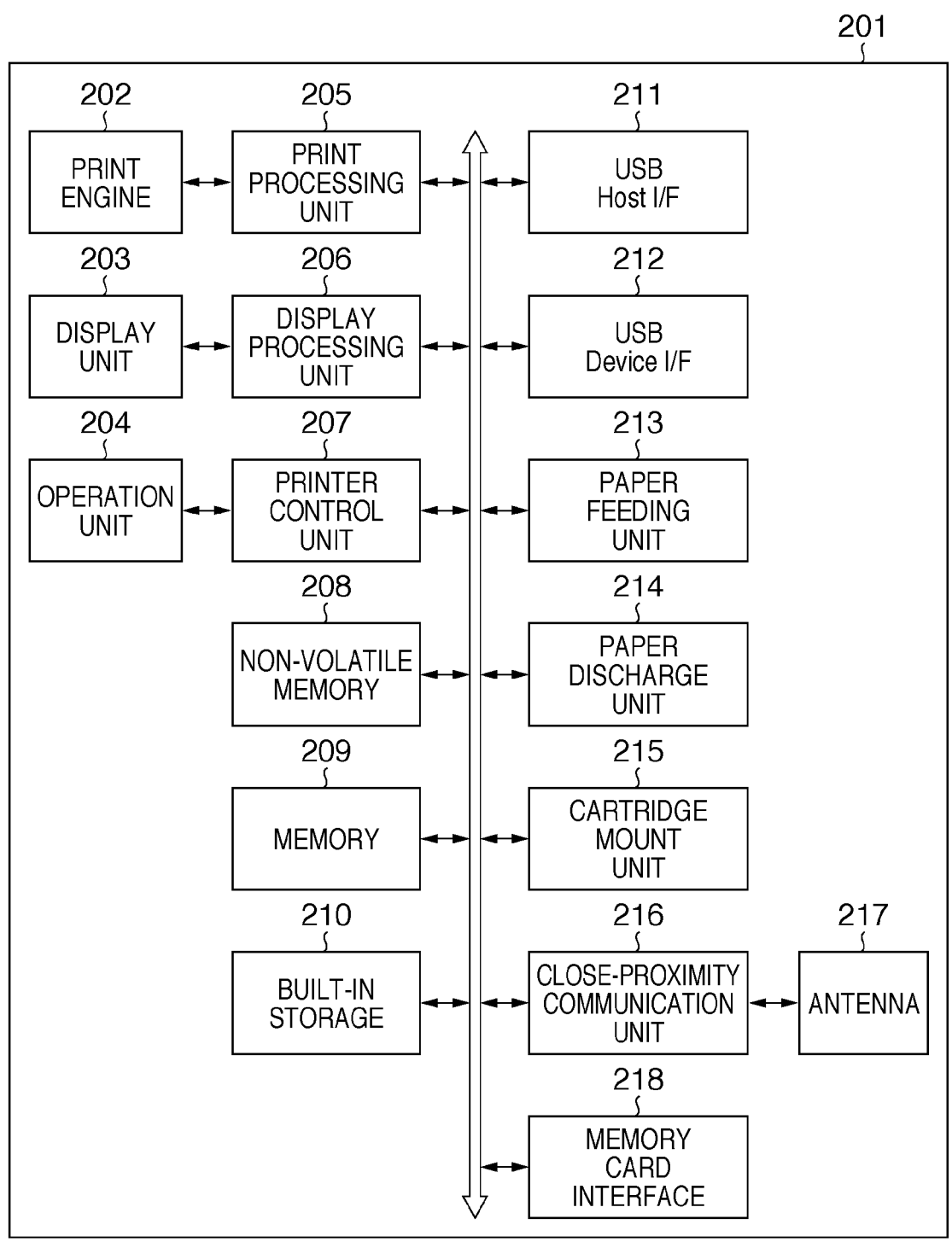
FIG. 2 is a block diagram illustrating an exemplary configuration of a printer as an example of an image output apparatus according to an embodiment of the present invention.

FIG. 2 is a block diagram illustrating an exemplary configuration of a printer 201 as an example of an image output apparatus according to an embodiment of the present invention. Although the printer 201 is an inkjet printer in this embodiment, the recording method may be any method, including the electrophotographic method and thermal transfer method. The printer 201 and an image providing apparatus (here, the digital camera 100) that are connected through close-proximity wireless communication are capable of constituting an image output system (for example, a direct print system).

The printer 201 operates under the control of a printer control unit 207, which is, for example, a CPU. A print processing unit 205 develops print data stored in a memory 209 into a bitmap format, and supplies the data to a print engine 202. The print engine 202 conveys sheets from a paper feeding unit 213, drives a print head attached to a cartridge mount unit 215, and carries out print processing based on the bitmap data supplied by the print processing unit 205. Then, the print engine 202 outputs the sheet that has undergone the print processing from a paper discharge unit 214.

A display unit 203 includes an LED and a speaker, and informs a user of the operating status of the printer 201, provides warnings, and so on by illuminating/flashing the LED or outputting a beep sound or an audio message under the control of a display processing unit 206.

The operation unit 204 includes switches, a dial, and the like, and is a user interface for a user to input various instructions to the printer 201. The operation unit 204 may be provided with a microphone and a speech recognition function so that instructions can be given with voice. A user's instructions inputted via the operation unit 204 are given to the printer control unit 207.

A non-volatile memory 208 is, for example, capable of being re-written electrically, and various settings and management information for the printer 201, programs executed by the printer control unit 207, and information necessary for operations of the printer 201 are stored therein.

A close-proximity communication unit 216 performs close-proximity wireless communication using an antenna 217 with an external device. In this embodiment, it is assumed that the close-proximity communication unit 110 of the digital camera 100 and the close-proximity communication unit 216 of the printer 201 support the same close-proximity wireless communication protocol. Thus, when the close-proximity communication unit 216 and the close-proximity communication unit 110 are brought within a distance that enables communication, the devices are able to communicate with each other.

A USB host interface (USB Host I/F) 211 is an interface for connecting an external host device such as a personal computer. A USB device interface (USB Device I/F) 212 is an interface for connecting an external device such as a digital camera 100.

As described above, in this embodiment, the digital camera 100 and the printer 201 perform close-proximity wireless communication through the close-proximity communication units 110 and 216. To be specific, the close-proximity wireless communication is used for communication between the digital camera 100 and the printer 201, for performing direct printing.

As in the case of the camera control unit 50, the printer control unit 207 may also be realized by a single piece of hardware, or may be configured from a plurality of pieces of hardware taking partial charge of the processing so as to substantially function as a printer control unit 207. At least a part of the processing may be realized by software.

Figure 3:
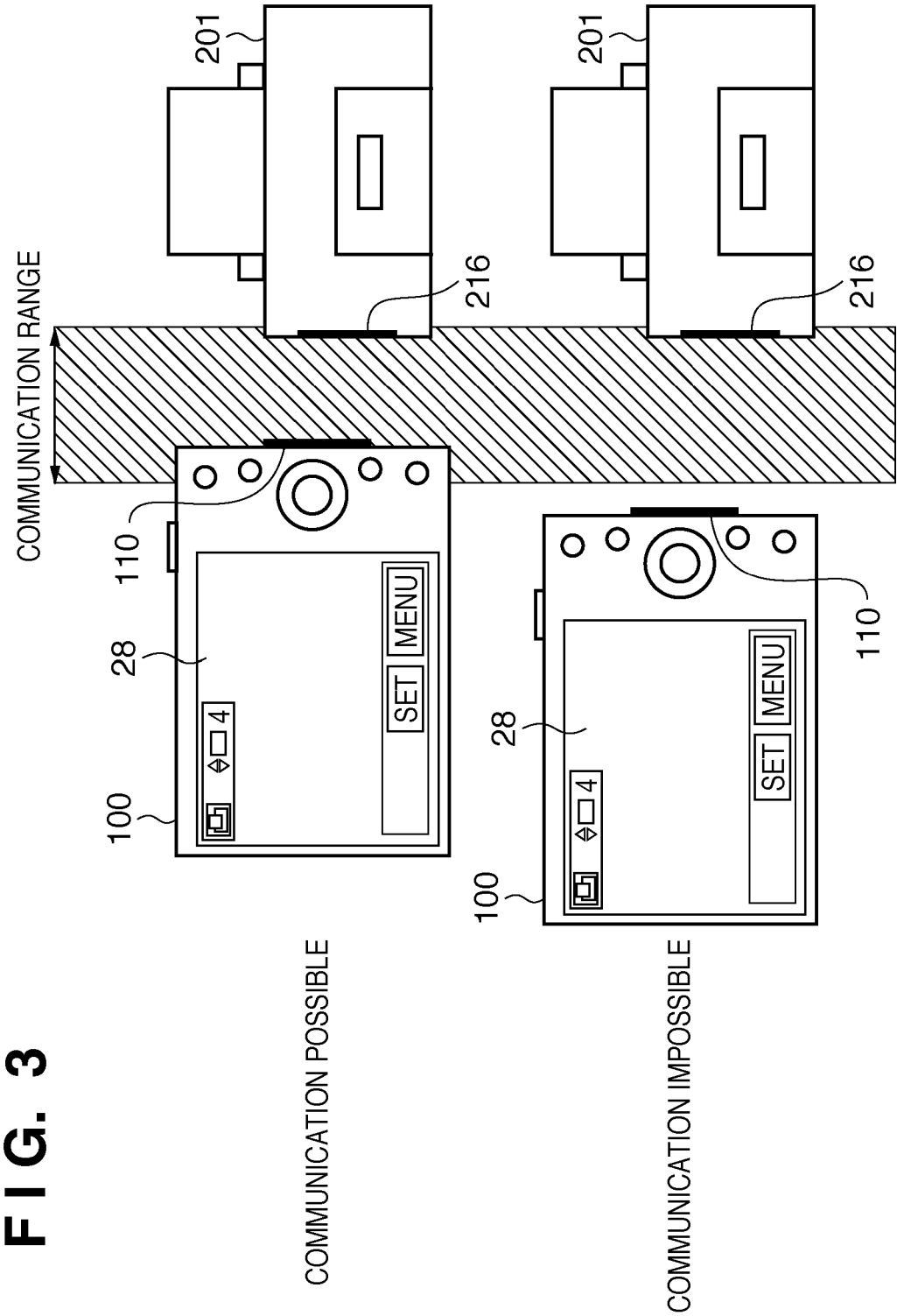
FIG. 3 is a diagram schematically illustrating close-proximity wireless communication between a digital camera 100 and a printer 201 according to an embodiment of the present invention.

FIG. 3 is a diagram schematically illustrating close-proximity wireless communication between the digital camera 100 and the printer 201 according to this embodiment.

In the close-proximity wireless communication according to this embodiment, a communication partner is detected by detecting an induced electromotive force caused by bringing the antenna 112 and the antenna 217 close together; therefore, the distance in which communication is possible is short. For example, as shown in the lower portion of FIG. 3, communication cannot be performed when the close-proximity communication unit 110 of the digital camera 100 is outside the communication range of the close-proximity communication unit 216 of the printer 201. Therefore, for example, when the status changes from the communication enabled status shown in the upper portion of FIG. 3 to the status shown in the lower portion of FIG. 3, communication is disconnected.

The close-proximity communication unit 110 of the digital camera 100 and the close-proximity communication unit 216 of the printer 201 initiate their connection by detecting an induced electromotive force caused by bringing the antennas 112 and 217 in close proximity, and a connection through close-proximity wireless communication is established thereby.

Afterwards, an upper protocol used for data communication between the digital camera 100 and the printer 201 is decided on, and communication according to the protocol that has been decided on is performed. The upper protocol is decided on based on a notification from the digital camera 100 to the printer 201.

In this embodiment, a USB connection is established through close-proximity wireless communication, the USB Mass Storage Class protocol (MSC) or PictBridge protocol is decided on as the upper protocol, and a connection is established and communication is performed.

In this embodiment, the purpose of the connection with the printer 201 is assumed by the digital camera 100, and the primary controller in the post-connection system is decided on; an upper protocol with which the primary controller is compatible is then automatically decided on. To be specific, the camera control unit 50 decides that the primary controller is the digital camera 100 when it is determined that the purpose of the connection is to print, and that the primary controller is the printer 201 when it is determined that the purpose of the connection is to store images.

In this embodiment, the PictBridge protocol is decided on as the upper protocol when the digital camera 100 is decided on as the primary controller. When it is decided that the printer 201 is the primary controller, it is decided that the USB Mass Storage Class protocol is the upper protocol. Thus, a primary controller that follows the user's intensions can realize operations afterwards. Furthermore, it is not necessary that the user care which protocol should be used for the connection. The protocol can be decided after establishing the connection through close-proximity wireless communication.

Methods for activating the digital camera 100 in this embodiment shall now be described.

There are generally two methods for activating the digital camera 100 in this embodiment.

In the first method, the digital camera 100 is activated by the camera control unit 50 detecting an operation by a user operating the power source switch included in the operation unit 70.

In the second method, the digital camera 100 is activated using an induced electromotive force caused when the digital camera 100 is moved close to the printer 201. To be specific, by moving the digital camera 100 close to the printer 201, the close-proximity communication unit 110 is first activated based on an induced electromotive force caused between the antennas 112 and 217. Then, the close-proximity communication unit 110 notifies the camera control unit 50 of the activation event, thereby activating the camera control unit 50, and activating the entire digital camera 100 under the control of the camera control unit 50.

With the digital camera 100 in this embodiment, the camera control unit 50 is notified of different events for the case when the activation is triggered by an operation on the power source switch, and for the case when the activation is triggered by an induced electromotive force arising in the antenna 112. Thus, the camera control unit 50 can determine which method was used for the activation. The camera control unit 50 stores information of the received activation event in the memory 52.

Furthermore, as in the case of the activation, two transition methods can be used when the digital camera 100 of this embodiment makes a transition from an energy-saving state (called a "sleep state" hereinafter) to a general power-consuming state (called a "wakeup state" hereinafter).

In the first method, the transition to the wakeup state is made by the camera control unit 50 detecting the operation on any of a switch, a button, or the like included in the operation unit 70 of the digital camera 100 while in the sleep state.

In the second method, as in the case for the activation, the camera control unit 50 causes the digital camera 100 to make the transition to the wakeup state by receiving a notification of an event from the close-proximity communication unit 110 based on the induced electromotive force arising in the antenna 112.

In this embodiment, the camera control unit 50 stores information on the event in the memory 52 when a transition is made from the sleep state to the wakeup state as well. The same event information may be used for the activation, and for the transition from the sleep state to the wakeup state, as long as it can be determined whether the first method using the operation unit or the second method using the induced electromotive force is used.

In this specification, the activation or the transition to the wakeup state using the induced electromotive force is referred to as "remote wakeup".

In this specification, an "active state" refers to a state other than a power off state and the sleep state. Thus, the remote wakeup means that the digital camera 100 has come to an active state using an induced electromotive force generated by moving the digital camera 100 close to the printer 201.

(Operation at the Time of Connection through Close-Proximity Wireless Communication—in Digital Camera)

Figure 4:
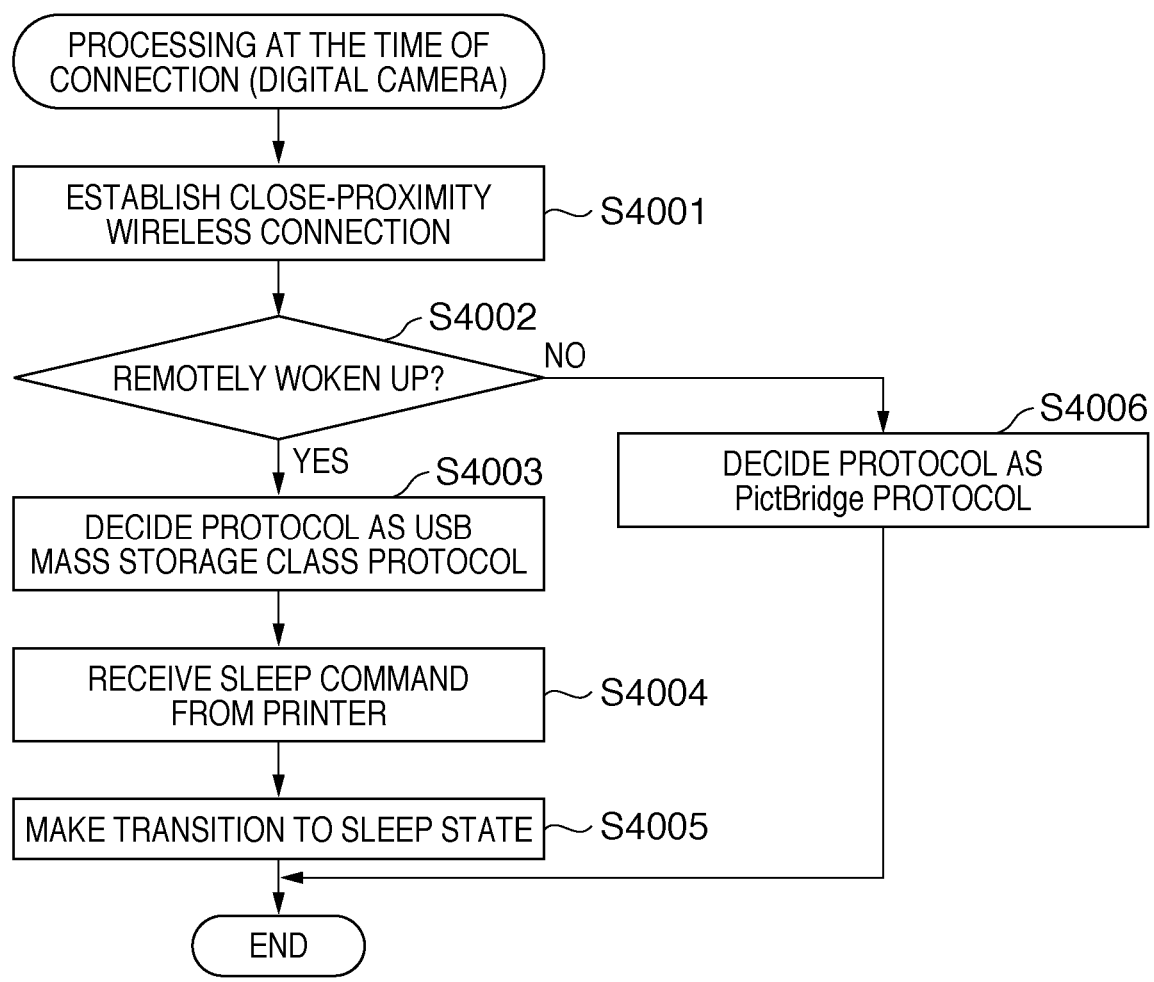
FIG. 4 is a flowchart illustrating processing operations when the digital camera 100 according to an embodiment of the present invention has established a connection with the printer 201 through close-proximity wireless communication.

FIG. 4 is a flowchart illustrating processing operations when the digital camera 100 according to this embodiment has established a connection with the printer 201 through close-proximity wireless communication.

In S4001, it is assumed that, for example, a user brings the digital camera 100 close to the printer 201, thereby bringing the close-proximity communication units 110 and 216 into a communication range. A wireless connection is thus established between the close-proximity communication units 110 and 216.

In S4002, the camera control unit 50 determines whether or not the digital camera 100 has been remotely woken up. As described above, the camera control unit 50 can perform this determination based on the information on an event stored in the memory 52 at the time of the activation or the transition from the sleep state to the wakeup state.

When the digital camera 100 has been remotely woken up, it means that the digital camera 100 was in the sleep state or the power off state before performing close-proximity wireless communication. Therefore, the camera control unit 50 determines that the user intends to operate the printer 201 rather than the digital camera 100, for example, for the purpose of storing images. Then, the camera control unit 50 decides that the primary controller after the connection is the printer, and decides that the USB Mass Storage Class (MSC) protocol is the upper protocol as an appropriate protocol (S4003).

Then, the camera control unit 50 establishes a connection according to the MSC protocol through the close-proximity communication unit 110 with the printer 201. As described above, when the connection is established with the MSC protocol, the digital camera 100 acts as a storage device connected to the printer 201. Thus, the process of browsing and printing image data stored in the digital camera 100 is realized by controlling the digital camera 100 from the printer 201. Therefore, this processing is executed using the operation unit 204 of the printer 201.

When the connection with the digital camera 100 that is activated as an MSC device is established, the printer control unit 207 sends a sleep command to the digital camera 100. When this sleep command is received through the close-proximity communication unit 110 (S4004), the camera control unit 50 causes the digital camera 100 to make a transition to the sleep state in S4005. When the transition is made to the sleep state, nothing is displayed on the image display unit 28 of the digital camera 100. This notifies the user of the fact that the primary controller in the following processing is the printer 201.

On the other hand, when it is determined that the digital camera 100 has not been remotely woken up in S4002, it means that the digital camera 100 was already in the active state before performing the close-proximity wireless communication. Thus, the camera control unit 50 determines that the connection with the printer was made with user's intention to operate the digital camera 100, for example, as in the case of the connection for the purpose of printing, and decides on the primary controller as the digital camera 100. Then, the Pict-Bridge protocol is decided on as the upper protocol (S4006). Then, the camera control unit 50 establishes a connection according to the PictBridge protocol with the printer 201. Afterwards, print processing is performed in accordance with the procedures specified by the PictBridge protocol. In this case, print settings, the selection of image data to be printed, and print instruction are executed using the operation unit 70 of the digital camera 100.

(Operation at the Time of Connection Through Close-Proximity Wireless Communication—in Printer)

Figure 5:
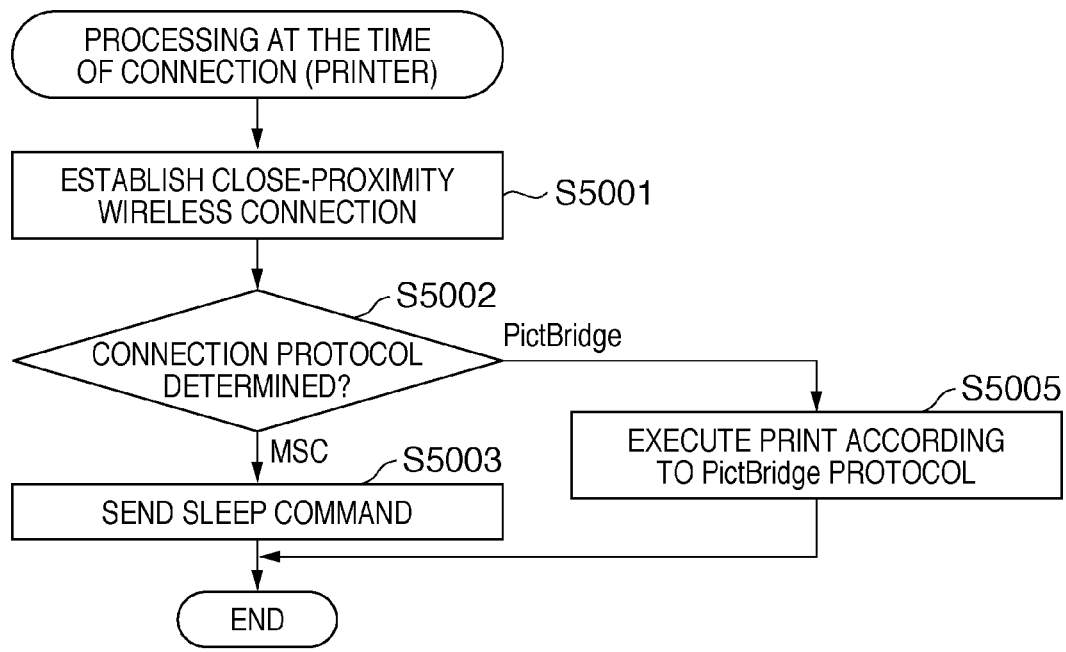
FIG. 5 is a flowchart illustrating processing operations when the printer 201 according to an embodiment of the present invention has established a connection with the digital camera 100 through close-proximity wireless communication.

FIG. 5 is a flowchart illustrating processing operations when the printer 201 according to this embodiment has established a connection with the digital camera 100 through close-proximity wireless communication.

After establishing the connection through close-proximity wireless communication as described above in S5001, a notification with regard to the upper protocol decided by the digital camera 100 is given.

In S5002, the printer control unit 207 determines whether the connection protocol notified by the digital camera 100 is MSC or PictBridge. When the protocol is MSC, the printer control unit 207 establishes a connection with the digital camera 100 according to the MSC protocol. Then, when the connection is established and the digital camera 100 is recognized as the storage device, the printer control unit 207 sends, in S5003, a command (sleep command) to make a transition to the sleep state to the digital camera 100 through the close-proximity communication unit 216.

On the other hand, when the connection protocol in the notification that was given from the digital camera 100 is PictBridge, the printer control unit 207 establishes a connection with the digital camera 100 according to the PictBridge protocol. Then, the printer control unit 207 performs operations such as print processing of image data in accordance with the instructions from the digital camera 100 according to the PictBridge protocol in S5005.

Figure 6:
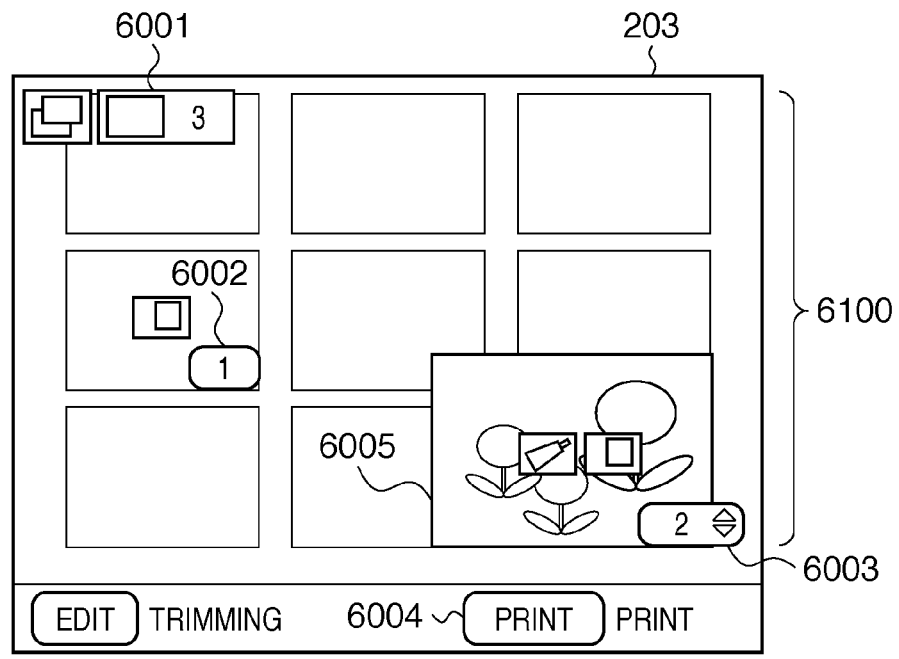
FIG. 6 is a diagram illustrating an example of an operation screen displayed on a display unit 203 of the printer 201 when the digital camera 100 according to an embodiment of the present invention has decided on the protocol as the MSC protocol, and established a connection with the printer 201.

FIG. 6 is a diagram illustrating an example of an operation screen displayed on the display unit 203 of the printer 201 when the digital camera 100 has decided on the protocol as the MSC protocol, and established a connection with the printer 201.

A user operates the operation unit 204 of the printer 201 while looking at this operation screen so as to instruct print settings and print execution.

In FIG. 6, the operation screen includes a region 6100 that displays thumbnail images of image data stored in the digital camera 100. The thumbnail images are obtained by the printer control unit 207 from the digital camera 100.

A total number icon 6001 indicates the total number to be printed that is currently set. The number for print execution can be set for individual images, and such a number can be displayed, for example, by an individual number icon 6002, by superimposing the number on or near the thumbnail image of the image data the print setting is made.

An image 6005 for which the print number settings are currently made is displayed at an enlarged size so that it can be distinguished from other images. For example, when operations are made with up arrow and down arrow keys of the operation unit 70 under such a state, the print number shown in 6003 increases or decreases.

A user can set the number to be printed for the selected image by, for example, shifting the cursor with operations through arrow keys and the like, and pressing a PRINT button 6004 while a desired image is being selected.

As described above, when the digital camera 100 established a connection with the printer 201 with the MSC protocol, the digital camera 100 enters the sleep state, and therefore nothing is displayed on the image display unit 28 of the digital camera 100. Furthermore, the sleep state in this case is different from the normal sleep state, and unless the close-proximity wireless communication is disconnected, resumption from the sleep state cannot be achieved even if the operation unit 70 is operated.

Figure 7A:
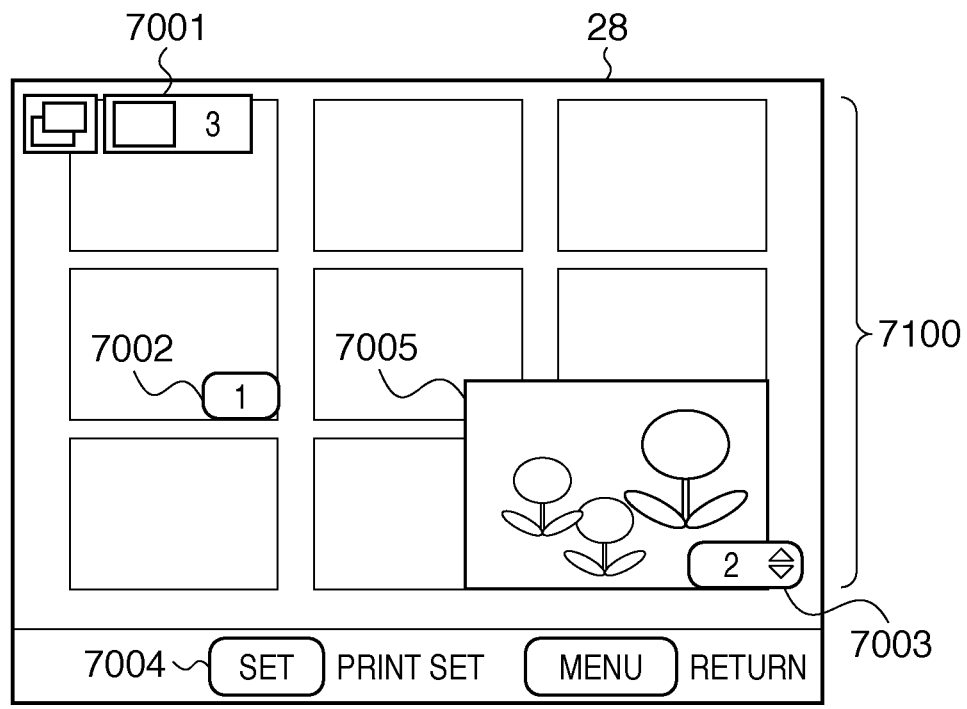
FIG. 7A and FIG. 7B are diagrams illustrating an example of screens displayed on the image display units 28 and 203 when a digital camera 100 and the printer 201 according to an embodiment of the present invention have established a connection through the PictBridge protocol.
Figure 7B:
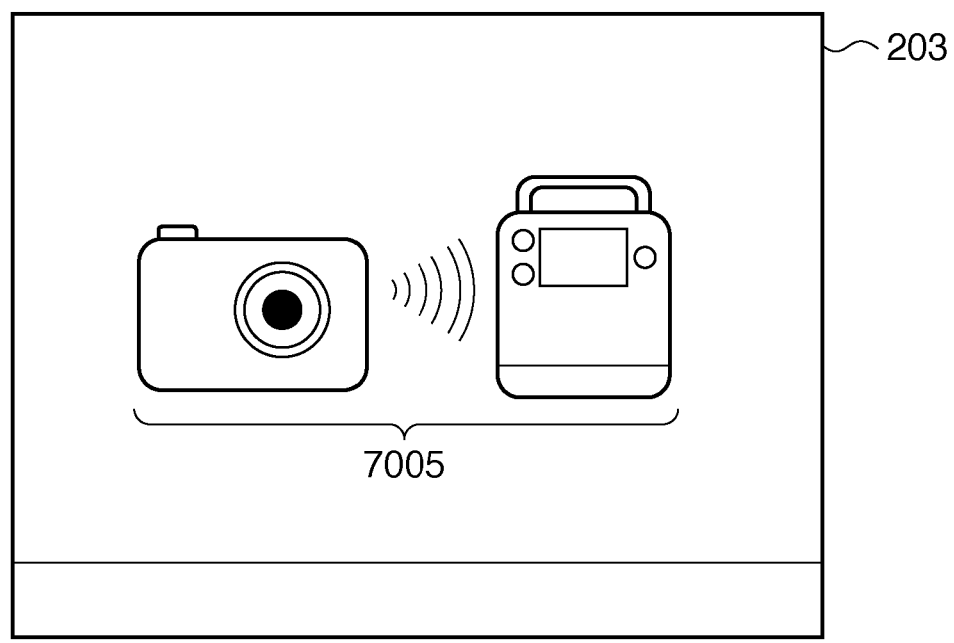

FIGS. 7A and 7B show diagrams illustrating examples of a screen displayed on the image display units 28 and 203 when the digital camera 100 and the printer 201 have established a connection through the PictBridge protocol. FIG. 7A shows an example of a screen displayed on the image display unit 28 of the digital camera 100, and FIG. 7B shows an example of a screen displayed on the display unit 203 of the printer 201.

The operation screen shown in FIG. 7A is displayed on the image display unit 28 of the digital camera 100, and a user operates the operation unit 70 of the digital camera 100 while looking at this operation screen so as to give the instruction for print settings and print execution. 7001 to 7003, 7005, and 7100 in FIG. 7A are the same as 6001 to 6003, 6005, and 6100 in FIG. 6, and therefore descriptions are omitted. A SET button 7004 is the same as the PRINT button 6004.

FIG. 7B shows an example of a screen displayed on the display unit 203 of the printer 201 when a connection is made under the digital camera 100 with the PictBridge protocol. The printer control unit 207 does not accept operation of the operation unit 204 in this state, and an image 7005 indicating that print settings and instructions are performed by operations to the digital camera 100 is displayed on the display unit 203.

As described above, according to this embodiment, the connection protocol is automatically set in the image providing apparatus capable of being connected with the image output apparatus using close-proximity wireless communication, by determining whether or not the active state is achieved by moving the image providing apparatus close to the image output apparatus. Therefore, it is not necessary for the user to perform troublesome operations regarding the protocol settings, and an image providing apparatus with excellent usability can be realized.

Furthermore, because the image output apparatus in this embodiment causes the image providing apparatus to enter the sleep state when a connection is made with the image providing apparatus under the protocol that sets the image output apparatus itself as the primary controller, the user can easily understand that the primary controller is the image output apparatus.

Other Embodiments

Although the protocol is switched in correspondence with the switching of the primary controller in the above-described embodiment, the primary controller can also be switched while using the same protocol.

For example, the PTP (Picture Transfer Protocol) is a protocol that allows both a digital camera and a printer to be the primary controller. Therefore, the primary controller may be switched while using one protocol, that is, PTP, without switching the protocol. In the following, such a case is described in detail.

After S4001 in FIG. 4, the camera control unit 50 establishes a connection according to the PTP with the printer 201 through the close-proximity communication unit 110. Then, in S4002, when it is determined by the camera control unit 50 that the digital camera 100 has been remotely woken up, the camera control unit 50 decides that the primary controller after the connection is the printer 201. Then, the camera control unit 50 notifies the printer 201 that the digital camera 100 has been remotely woken up as the notification of the decided primary controller. Then, the camera control unit 50 shifts the mode of the digital camera 100 to a mode for accepting operations from the printer 201, and turns off the display on the image display unit 28.

Meanwhile, when a notification that the digital camera 100 has been remotely woken up is received in S5002 of FIG. 5, the printer control unit 207 causes the printer 201 to shift the mode to a mode for operating the digital camera 100, and displays the screen as shown in FIG. 6.

When the camera control unit 50 determines that the digital camera 100 was not remotely woken up in S4002 of FIG. 4, the camera control unit 50 decides that the primary controller after the connection is the digital camera 100. Then, the camera control unit 50 notifies the printer 201 that the digital camera 100 has not been remotely woken up as the notification of the decided primary controller. Then, the camera control unit 50 shifts the mode of the digital camera 100 to a mode for operating the printer 201, and displays a screen as shown in FIG. 7A on the image display unit 28.

When the printer 201 received a notification from the digital camera 100 that the digital camera 100 has not been remotely woken up in S5002, the printer 201 shifts its mode to a mode for accepting operations from the digital camera 100, and displays a screen as shown in FIG. 7B.

Here, it is assumed that the primary controller is not limited in the upper layer of the PTP. Although the PTP is used for the transportation layer in the PictBridge protocol as well, according to the DPS layer and the DPS application layer that are positioned thereabove, the digital camera 100 becomes the primary controller when using the Pictbriege protocol.

Note that the foregoing embodiments can also be realized with software by a computer (or CPU, MPU, etc.) of an image providing apparatus or an image output apparatus.

Consequently, the present invention is also realized by a computer program supplied to a computer, in order to realize the foregoing embodiments by computer. In other words, a computer program for realizing the functions of the foregoing embodiments is also one of the inventions.

Note that a computer program for realizing the foregoing embodiments may take any form, provided that it is computer readable. For example, the computer program can be composed of object code, a program executed by an interpreter, or script data supplied to an operating system, while not being limited to these configurations.

A computer program for realizing the foregoing embodiments is supplied to a computer by a storage medium or by wired/wireless communication. Examples of storage media for supplying the program include magnetic storage media such as flexible disks, hard disks, and magnetic tape, optical/magneto-optical storage media such as MOs, CDs, and DVDs, and nonvolatile semiconductor memories.

One method of supplying a computer program using wired or wireless communication involves utilizing a server on a computer network. In this case, a data file (program file) capable of becoming a computer program that forms the present invention is stored on the server. The program file may be in execution format or source code.

The computer program is then supplied by downloading the program file to a client computer that has accessed the server. In this case, it is also possible to divide the program file into a plurality of segment files, and disperse the segment files among different servers.

That is, a server apparatus that provides a program file for realizing the foregoing embodiments to a client computer is also one of the inventions.

It is also possible to distribute a storage medium storing a computer program for realizing the foregoing embodiments in encrypted form, supply decryption key information to a user that meets a prescribed requirement, and permit installation to the user's computer. The key information can be supplied by being downloaded from a website via the Internet, for example.

A computer program for realizing the foregoing embodiments may utilize the functions of an operating system already running on a computer.

Further, part of a computer program for realizing the foregoing embodiments may be composed of firmware such as an expansion board mounted in a computer, or may be executed by a CPU provided with an expansion board or the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-171239, filed on Jun. 30, 2008, which is hereby incorporated by reference herein its entirety.

What is claimed is:

1. An image providing apparatus including a communication unit for communicating with an image output apparatus through proximity wireless communication, and capable of constituting an image output system along with the image output apparatus that is connected via the communication unit, the image providing apparatus comprising:
   an operation unit that accepts a user's operation;
   a determination unit that determines, if a connection through the proximity wireless communication is established with the image output apparatus via the communication unit, whether (1) moving close to the image output apparatus causes the image providing apparatus to come to an active state, or (2) the image providing apparatus has already come to the active state by a user operation accepted by the operation unit before the connection is established, and
   a decision unit that decides on the primary controller in the image output system as one of the image providing apparatus and the image output apparatus according to a result of the determination by the determination unit,
   wherein the decision unit decides that the primary controller in the image output system is the image output apparatus if the determination unit has determined that moving close to the image output apparatus causes the image providing apparatus to come to an active state, and decides that the primary controller in the image output system is the image providing apparatus if the determination unit has determined that the image providing apparatus has already come to the active state by a user operation accepted by the operation unit before the connection is established.

2. The image providing apparatus according to claim 1, wherein the determination unit determines whether or not the image providing apparatus reached an active state by an induced electromotive force arising in an antenna included in the communication unit caused by moving close to the image output apparatus.

3. The image providing apparatus according to claim 1, further comprising a connection unit that establishes a logical connection with the image output apparatus using the PictBridge protocol if the decision unit has decided that the image output apparatus is the primary controller, and using the USB Mass Storage Class protocol if the decision unit has decided that the image providing apparatus is the primary controller.

4. An image output system constituted by an image output apparatus and an image providing apparatus connected through proximity wireless communication,
   the image providing apparatus comprising:
   an operation unit that accepts a user's operation;
   a determination unit that determines, if a connection through the proximity wireless communication is established with the image output apparatus via the communication unit, whether (1) moving close to the image output apparatus causes the image providing apparatus to come to an active state or (2) the image providing apparatus has already come to the active state by a user operation accepted by the operation unit before the connection is established whether or not moving close to the image output apparatus causes the image providing apparatus to come to an active state if a connection through the close proximity wireless communication is established,
   a decision unit that decides that the primary controller in the image output system is the image output apparatus if the determination unit has determined that moving close to the image output apparatus causes the image providing apparatus to come to an active state, and decides that the primary controller in the image output system is the image providing apparatus if the determination unit has determined that the image providing apparatus has already come to the active state by a user operation accepted by the operation unit before the connection is established, and
   a notification unit that notifies the image output apparatus of the primary controller; and
   the image output apparatus comprising:
   a receiving unit that receives, from the image providing apparatus, a notification of the primary controller if a connection with the image providing apparatus through the proximity wireless communication is established, and
   a sending unit that sends, to the image providing apparatus, a command that causes the image providing apparatus to enter a sleep state if the receiving unit has received the notification indicating that the image output apparatus is the primary controller.

5. A method for controlling an image providing apparatus including a communication unit for communicating with an image output apparatus through proximity wireless communication, and capable of constituting an image output system along with the image output apparatus that is connected via the communication unit, the method comprising:
   a determination step of determining, if a connection through the proximity wireless communication is established with the image output apparatus via the communication unit, whether (1) moving close to the image output apparatus causes the image providing apparatus to come to an active state, or (2) the image providing apparatus has already come to the active state by a user operation accepted by the operation unit before the connection is established, and a decision step of deciding on the primary controller in the image output system constituted along with the image output apparatus as one of the image providing apparatus and the image output apparatus according to a result of the determination in the determination step, wherein in the decision step, it is decided that the primary controller in the image output system constituted along with the image output apparatus is the image output apparatus if it is determined that moving close to the image output apparatus causes the image providing apparatus to come to an active state in the determination step, and it is decided that the primary controller in the image output system is the image providing apparatus if it is determined that the image providing apparatus has already come to the active state by a user operation accepted by the operation unit before the connection is established.

6. A non-transitory computer-readable storage medium storing a program for causing a computer to function as the image providing apparatus according to claim 1.

7. The image providing apparatus according to claim 1, wherein the state of the image providing apparatus before the connection through the proximity wireless communication is established with the image output apparatus via the communication unit is not the active state, the decision unit decides that the primary controller in the image output system is the image providing apparatus.

8. The image providing apparatus according to claim 1, wherein the state of the image providing apparatus enters a sleep state in response to a notification from the image output apparatus, if the decision unit decides that the primary controller in the image output system is the image output apparatus.

9. The image providing apparatus according to claim 8, wherein the sleep state is continued until the communication with the image output apparatus is disconnected.

10. The image providing apparatus according to claim 8, wherein the image providing apparatus is capable of entering at least one of states including the active state and the sleep state based on a user's operation.

11. The image providing apparatus according to claim 1, wherein a state of the image providing apparatus, before the connection through the proximity wireless communication is established with the image output apparatus via the communication unit, is the active state, the determination unit determines that the image providing apparatus has already come to the active state by a user operation accepted by the operation unit before the connection is established, and wherein the state of the image providing apparatus, before the connection through the proximity wireless communication is established with the image output apparatus via the communication unit, is not the active state, the determination unit determines that moving close to the image output apparatus causes the image providing apparatus to come to an active state.

12. An image providing apparatus including a communication unit for communicating with an image output apparatus through proximity wireless communication, and capable of constituting an image output system along with the image output apparatus that is connected via the communication unit, the image providing apparatus comprising:

a determination unit that determines, if a connection through the proximity wireless communication is established with the image output apparatus via the communication unit, whether the image providing apparatus has already been in the active state by user operation before the proximity wireless communication is established, and a decision unit that decides on the primary controller in the image output system as one of the image providing apparatus and the image output apparatus according to a result of the determination by the determination unit, wherein the decision unit decides that data communication in the image output system is to be controlled based on a user operation received at the image output apparatus if the determination unit has determined that the image providing apparatus has not already been the active state before the proximity wireless communication is established, and decides that the data communication in the image output system is to be controlled based on a user operation received at the image providing apparatus if the determination unit has determined that the image providing apparatus has already been the active state before the proximity wireless communication is established.

13. The image providing apparatus according to claim 12, further comprising:

a storage unit that stores information on an event, wherein the information indicates what procedure was used to activate the image providing apparatus and a different value of the information indicating a different procedure, and wherein the determination unit determines whether the image providing apparatus has already been the active state before the proximity wireless communication is established by referring to the information stored in the storage unit.

14. The image providing apparatus according to claim 12, further comprising a connection unit that establishes a logical connection with the image output apparatus using the PictBridge protocol if the decision unit has decided that the image output apparatus is the primary controller, and using the USB Mass Storage Class protocol if the decision unit has decided that the image providing apparatus is the primary controller.

15. The image providing apparatus according to claim 12, if the decision unit decides that the data communication in the image output system is to be controlled based on a user operation received at the image output apparatus, the image providing apparatus enters a sleep state.

16. An image providing apparatus including a communication unit for communicating with an image output apparatus through proximity wireless communication, and capable of constituting an image output system along with the image output apparatus that is connected via the communication unit, the image providing apparatus comprising:

a decision unit that decides that data communication in the image output system is to be controlled based on a user operation received at the image output apparatus if the image providing apparatus has not already been in the active state by user operation before the proximity wireless communication is established, and decides that the data communication in the image output system is to be controlled based on a user operation received at the image providing apparatus if the image providing apparatus has already been in the active state by user operation before the proximity wireless communication is established.

17. The image providing apparatus according to claim 16, further comprising a connection unit that establishes a logical connection with the image output apparatus using the PictBridge protocol if the decision unit has decided that the image output apparatus is the primary controller, and using the USB Mass Storage Class protocol if the decision unit has decided that the image providing apparatus is the primary controller.

18. The image providing apparatus according to claim 16, if the decision unit decides that the data communication in the image output system is to be controlled based on a user operation received at the image output apparatus, the image providing apparatus enters a sleep state.

* * * * *